United States Patent
Edwards et al.

(10) Patent No.: US 10,001,909 B2
(45) Date of Patent: Jun. 19, 2018

(54) TOUCH OPTIMIZATIONS FOR RANGE SLIDER CONTROLS

(71) Applicant: Microsoft Technology Licensing, LLC, Redmond, WA (US)

(72) Inventors: Jeremy Jude Alexi Edwards, Bothell, WA (US); Sachin Patney, Bellevue, WA (US); Avi Samuel Gavlovski Kaufman, Kirkland, WA (US); Robert A. Meyers, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 956 days.

(21) Appl. No.: 13/827,484

(22) Filed: Mar. 14, 2013

(65) Prior Publication Data

US 2014/0282252 A1 Sep. 18, 2014

(51) Int. Cl.
*G06F 3/048* (2013.01)
*G06F 3/0484* (2013.01)

(52) U.S. Cl.
CPC ................................. *G06F 3/04847* (2013.01)

(58) Field of Classification Search
CPC .................. G06F 3/04847; G06F 3/04855
USPC ......................................................... 715/833
See application file for complete search history.

(56) References Cited

U.S. PATENT DOCUMENTS

| | | | |
|---|---|---|---|
| 7,765,491 B1 * | 7/2010 | Cotterill | G06F 3/04847 345/156 |
| 8,352,877 B2 | 1/2013 | Beatty et al. | |
| 2008/0184167 A1 | 7/2008 | Berrill et al. | |
| 2010/0156830 A1 | 6/2010 | Homma et al. | |
| 2012/0030626 A1 * | 2/2012 | Hopkins | G06F 3/04847 715/833 |
| 2012/0237915 A1 * | 9/2012 | Krohner | G09B 7/02 434/323 |

OTHER PUBLICATIONS

Jansen, et al., "Tangible Remote Controllers for Wall-Size Displays", In Proceedings of ACM Annual Conference on Human Factors in Computing Systems, May 5, 2012, 10 pages.

Loclair, et al., "PinchWatch: A Wearable Device for One-Handed Microinteractions", In Proceedings of the 12th Conference on Human-Computer Interaction with Mobile Devices and Services, Sep. 7, 2010, 4 pages.

(Continued)

*Primary Examiner* — Di Xiao
(74) *Attorney, Agent, or Firm* — Workman Nydegger

(57) ABSTRACT

Operating a range slider. A method includes displaying a range slider in a graphical user interface. The method further includes detecting a minimum selecting user interaction on a graphical user interface. The method further includes placing the minimum slider thumb at value on the slider track by placing the inside edge of the minimum slider thumb on the value to select the minimum endpoint of the selected range at the inside edge of the minimum slider thumb. The method further includes detecting a maximum selecting user interaction on the graphical user interface. The method further includes placing the maximum slider thumb at a value on the slider track by placing the inside edge of the maximum slider thumb on the value to select the maximum endpoint of the selected range at the inside edge of the maximum slider thumb.

20 Claims, 2 Drawing Sheets

(56) References Cited

OTHER PUBLICATIONS

Moscovich, Tomer, "Contact Area Interaction with Sliding Widgets", In Proceedings of the 22nd Annual ACM Symposium on User Interface Software and Technology, Oct. 4, 2009, 10 pages.
Marquardt, et al., "The Continuous Interaction Space: Interaction Techniques Unifying Touch and Gesture on and above a Digital Surface", In Proceedings of the 13th IFIP TC 13 International Conference on Human-Computer Interaction—vol. Part III, Sep. 5, 2011, 16 pages.

\* cited by examiner

TOUCH OPTIMIZATIONS FOR RANGE SLIDER CONTROLS

BACKGROUND

Background and Relevant Art

Computers and computing systems have affected nearly every aspect of modern living. Computers are generally involved in work, recreation, healthcare, transportation, entertainment, household management, etc.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like. One element that may be used in a graphical user interface is a range slider. A range slider has a slider track with a scale from some minimum value to some maximum value and two so called "slider thumbs" each of which can be positioned on any point the track, up to and including the minimum value and the maximum value of the scale, to select a range on the scale.

Range sliders on traditional desktop applications are interacted with thru the use of the mouse, which is much more precise than touch interactions. When implementing range sliders for a touch experience, there are a number of challenges. First, is the "fat finger" problem where people try to touch one UI element but end up triggering a different UI element than the intended UI element. In the case of range sliders, this could mean moving one slider thumb instead of the other, or simply being unable to trigger the slider thumb at all. Secondly, because sliders require drag gestures, even higher precision is sometimes needed to avoid losing touch with the slider thumb during the course of the drag gesture. Third, while the finger is on the screen it is difficult to pinpoint the exact position of the slider thumb underneath it. Fourth, slider thumbs can overlap each other making it even more difficult to select one or the other.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for operating a range slider. The method displaying a range slider in a graphical user interface. The range slider includes a slider track representing a track range of values, including a minimum track value and a maximum track value, from which a selected range of values can be specified. The range of values includes a minimum endpoint and a maximum endpoint. The selected range of values is at least a portion of the track range of values. The range slider further includes a minimum value slider thumb placeable by user interaction with the graphical user interface at the minimum endpoint of the selected range. The minimum value slider has an inside edge and an outside edge. The inside edge of the minimum value slider is more proximate the maximum track value than the outside edge of the minimum value slider thumb. The minimum value slider thumb is placeable at the minimum endpoint by placing the inside edge of the minimum value slider thumb at the minimum endpoint. The range slider further includes a maximum value slider thumb placeable by user interaction with the graphical user interface at the maximum endpoint of the selected range. The maximum value slider has an inside edge and an outside edge. The inside edge of the maximum value slider is more proximate the minimum track value than the outside edge of the minimum value slider thumb. The maximum value slider thumb is placeable at the maximum endpoint by placing the inside edge of the maximum value slider thumb at the maximum endpoint, such that the minimum value slider thumb and the maximum value slider thumb do not overlap for any selected range. The method further includes detecting a minimum selecting user interaction on a graphical user interface. As a result of detecting a minimum selecting user interaction on the graphical user interface, the method further includes placing the minimum slider thumb at value on the slider track by placing the inside edge of the minimum slider thumb on the value to select the minimum endpoint of the selected range at the inside edge of the minimum slider thumb. The method further includes detecting a maximum selecting user interaction on the graphical user interface. As a result of detecting a maximum selecting user interaction on a graphical user interface, the method further includes placing the maximum slider thumb at a value on the slider track by placing the inside edge of the maximum slider thumb on the value to select the maximum endpoint of the selected range at the inside edge of the maximum slider thumb.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein implement range sliders that can be optimized for user friendliness. As mentioned above, a range slider has a slider track with a scale from some minimum value to some maximum value and two so called "slider thumbs" each of which can be positioned on any point the track, up to and including the minimum value and the maximum value of the scale, to select a range on the scale, the range having endpoints. An endpoint is a logical limit, and the selected range thumb is the UI element corresponding to an endpoint. The minimum and maximum values correspond to a specific field or measure in a data model, for example, the "Revenue" field of a "Movie" entity. Of course it could also correspond to any other numerical measure, whether pertinent to a data model or not.

Some embodiments are especially useful for touch based interfaces where a user uses a finger or stylus to interact with the user interface. However, features may also improve user performance on mouse pointer based user interfaces as well. Embodiments may achieve this user friendliness by implementing one or more of the following.

(a) Flexibility of starting the touch-and-drag gesture from various locations, even outside the slider track area. A drag gesture can be defined as a touch gesture in which the user touches a screen, moves the finger along the surface of the screen without lifting up the finger from the screen, and then lifts the finger from touching the screen (b) Smart detection of which slider thumb to move, by proximity.

(c) Having the inner edges of the slider thumbs be the effective points.

(d) Smart detection of open-ended endpoints.

(e) Adjusting slider thumb center to touch point.

Figure 1:
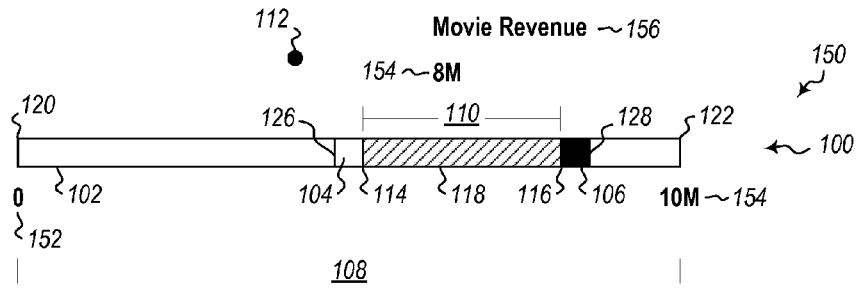
FIG. 1 illustrates a view of a range slider control.

Referring now to FIG. 1, an example is illustrated. FIG. 1 illustrates a range slider 100. The range slider 100 includes a slider track 102, a minimum value slider thumb 104 and a maximum value slider thumb 106. The slider track 102 defines a range 108 of values that can be selected by a user.

The user selects a range of values by placing the minimum value slider thumb 104 at a minimum endpoint of a selected range 110 and the maximum value slider thumb 106 at a maximum endpoint of the selected range 110 an the slider track 102.

Embodiments may provide flexibility of being able to start the touch-and-drag gesture even outside the range slider track 102 area. For example, a user could begin a gesture at a touch point 112. The system would know that the touch gesture applied to the minimum value slider thumb 104 due to the point 112 being more proximate the minimum value slider thumb 104 than the maximum value slider thumb 106. To be able to start the touch-and-drag gesture even outside the range slider track 102 area, the range slider 100 takes an arbitrary ancestor element in the UI tree which is interpreted as the touch region (embodiments will refer to this element using the name touch region from here on). In some embodiments, the range slider 100 is contained within a larger element. An example is illustrated herein as a "range control" 150. The range control contains (a) the range slider 100 (b) a text element 152 below the left end of the slider showing the minimum track value (c) a text element 154 below the right end of the slider showing the current maximum track value (d) another text element 156 above the slider showing the current maximum selected value and (e) a "title" text element which corresponds to the numerical field/measure that the range is applied to (e.g. movie revenue) and (f) a "restatement" text element (not shown) which shows a description of the currently selected range in words (e.g. "greater than 5 and less than or equal to 10").

As noted above, embodiments may implement smart detection of which slider thumb to move, by proximity. For example, as illustrated in FIG. 1, When the user initiates a drag motion (touch start event from here on) embodiments use a heuristic to determine which slider thumb they intend to drag, based on the distance between the touch point 112 and the slider thumbs 104 and 106.

Figure 2:
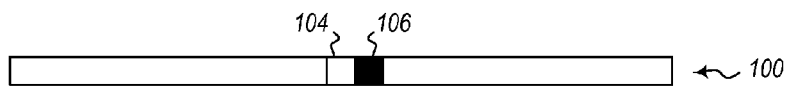
FIG. 2 illustrates another view of a range slider control.

Embodiments may treat the inner edges 114 and 116 of the slider thumbs 104 and 106 respectively as the effective points, rather than the center of the slider thumbs 104 and 106. This means (by definition) that all potential desired ranges are representable without requiring overlaps between the slider thumbs. For example, FIG. 2 illustrates where both slider thumbs 104 and 106 remain visible and non-overlapping even though a range has been selected where both the minimum and maximum endpoints are the same point. To make it clear to the user that the inner edge of the slider thumb is the effective point, embodiments may present a shade element showing the range 118 (FIG. 1) between the slider thumbs 104 and 106 that corresponds to the selected range.

Figure 3:
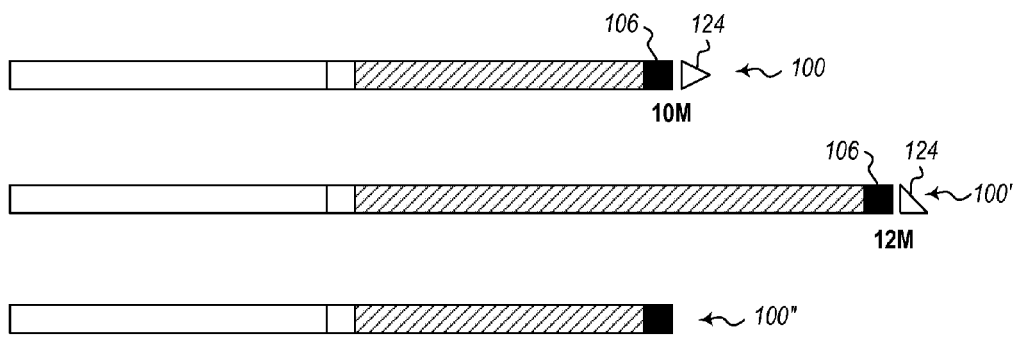
FIG. 3 illustrates yet another view of a range slider control.

To allow users to define an open-ended range, some embodiments automatically interpret a drag-to-end action (dragging a slider thumb to the minimum track value 120 and/or the maximum track value 122) as an open-ended range definition. Thus, if the track range 108 increases, the slider thumb will be moved to match that increase such that the slider thumb is at the minimum or maximum track value, even when the track range 108 increases. For example, FIG. 3 illustrates an example of a range slider 100 that has values from 0 to 10M. A user has dragged the maximum range slider thumb 106 to the 10M point. At some later point, the range slider is increased to 12M, as illustrated at 100' to represent an increase in selectable values. However, because the maximum range slider thumb 106 was placed by the user at the maximum point of 10M thru direct user interaction, when the range slider is increased to 12M, the maximum range slider thumb 106 is automatically moved to the 12M point.

Embodiments may include functionality for indicating that a selection is open ended. For example, FIG. 3 illustrates an arrow 124 indicating that a selected range is open ended. This may allow a user to further select whether they want an open ended selection or are simply selecting a value that happens to be the maximum value of a range slider 100. For example, a user may drag the maximum value slider thumb to the maximum track value 122 and the arrow 124 would not appear, as illustrated at 100". However if the user attempts to drag the maximum value slider thumb 106 past the maximum track value 122, the maximum value slider thumb 106 would not move past that value, but instead the arrow 124 (or other indicator) would appear as indicated at 100 and 100' in FIG. 3 indicating that the maximum value slider thumb 106 is intended to select an open ended value.

Figure 4:
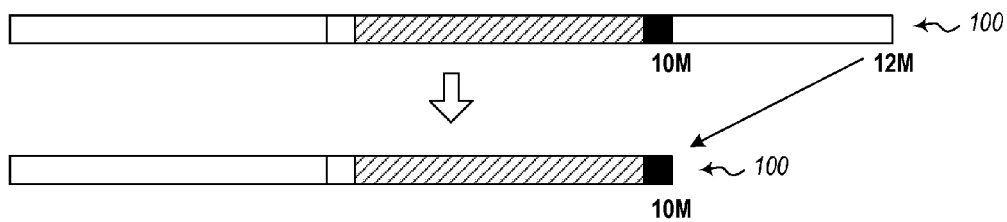
FIG. 4 illustrates yet another view of a range slider control.

Further, if the maximum range slider track value of the selected range 108 changes such that the maximum endpoint value of the selected range 108 is now lower than the range slider maximum track value 122, embodiments do not make the endpoint open-ended, as the user does not intend this result. Similarly, if the minimum endpoint value of the selected range 108 changes such that the minimum endpoint value of the selected range 108 is now higher than the range slider minimum track value 120, embodiments do not make the endpoint open-ended, as the user does not intend this result. For example, Additionally, if the maximum (or minimum) endpoint value of the selected range becomes the same as the range slider maximum track value 122 (or minimum track value 120) due to an external event and not the user moving the maximum value slider thumb 106 (or minimum value slider thumb 104), then the endpoint does not become open ended. For example, As illustrated in FIG. 4, if the maximum value slider thumb 106 is placed on a value of 10M and the range slider 100 transforms from a range slider that has a maximum track value of 12M to a range slider that has a maximum track value of 10M by external effects (such as operations being performed on a linked range), the maximum endpoint is not open ended even though it is at the maximum track value of 10M.

The following illustrates an end-to-end scenario Assume, for example, a situation dealing with movie revenues. A UI has the following elements in the UI.

(a) A bar chart showing the revenue, profit, and production cost of various movies.

(b) A revenue filter, which allows us to narrow down the content of the bar chart to the movies within a specific revenue range. This filter contains a range slider.

(c) A year filter, to allow us to see movies that were released in a specific year. This filter does_not_contain a range slider, just a simple date-picker control.

Assume that the year filter is currently specifying the year 2012 (and so the bar chart and the revenue filter are showing data corresponding to 2012 movies only). If the movies in the database, released in 2012, have had revenues from $0 to $100M, then the minimum and maximum values of the slider will be 0 and 100M respectively.

Now consider the following sequence of events:

(1) The user specifies a selected range of $25M to $75M by interacting with the range slider (the revenue filter). This causes the bar chart to be updated to only contain movies in that revenue range. Note that both endpoints of the range filter are currently closed-ended.

(2) The user interacts with the year filter, selecting now the year 2013.

(3) Now the bar chart updates to show only 2013 movies, and also the range filter updates: If the movies in the database, released in 2013, have had revenues from $0M to $50M (instead of $100M), then the maximum allowed value of the slider will be 75M, instead of 100M as it was before (it cannot become 50M because it would exclude the currently-selected maximum endpoint). At this point, the maximum value of the slider became equal to the currently-specified maximum endpoint, but not because of user-interaction with the range slider itself. Thus, embodiments do not make the endpoint be open-ended at this point, because on a subsequence interaction (e.g. selecting year 2011) the user would not expect to see movies with revenues greater than 75M, as his last interaction with the range slider (back in step 1) intended to specify a closed-ended maximum endpoint at 75M.

While in the example illustrated above, the inner edges 114 and 116 are used to mark the maximum and minimum endpoints of the selected range 118, on touch-start, some embodiments nonetheless adjust the slider thumb position (of the slider thumb selected thru the above-mentioned heuristic) such that the approximate center of the slider thumb (104 or 106) is positioned at the touch point. Thus, the touch point 112 does not necessarily correspond to a selected endpoint, but rather to the approximate center of a slider thumb.

The touch region, as explained above, does not only include the slider track, but the whole area of the card. An example of a card is illustrated above in the range control there illustrated.

Different slider thumbs may indicate different range components. For example, a black slider thumb may indicate an inclusive range, while a white slider thumb indicates an exclusive range. "Inclusive" refers to "less than or equal" or "greater than or equal" conditions, while "exclusive" refers to "less than" or "greater than" conditions The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
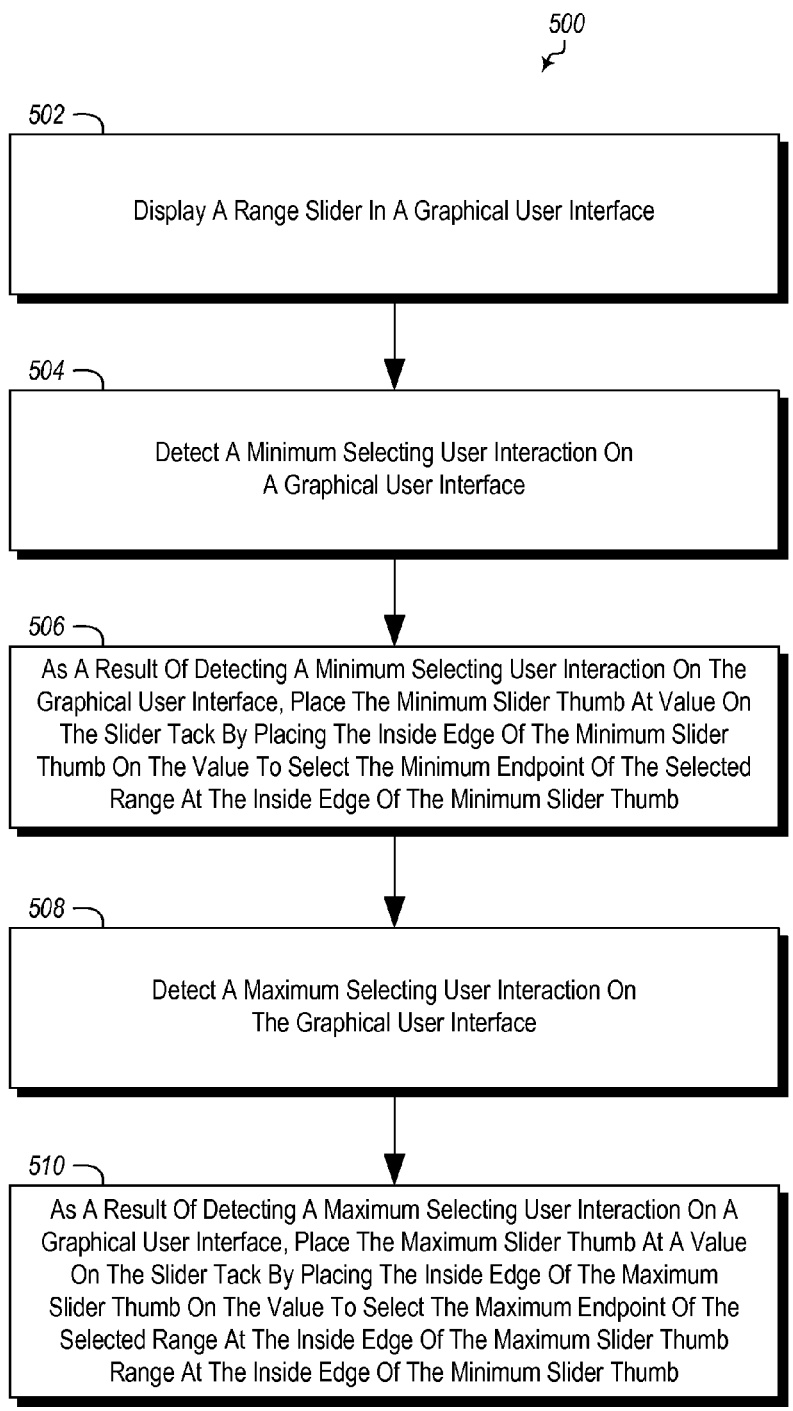
FIG. 5 illustrates a method of operating a range slider.

Referring now to FIG. 5, a method 500 is illustrated. The method may be practiced in a computing environment and includes acts for operating a range slider. The method includes displaying a range slider in a graphical user interface (act 502). The range slider (e.g. 100) includes a slider track (e.g. 102) representing a track range of values, including a minimum track value (e.g. 120) and a maximum track value (e.g. 122), from which a selected range of values can be selected. The range of values includes a minimum endpoint and a maximum endpoint. The selected range of values is at least a portion of the track range of values. In some embodiments, the selected range could be the whole track range of values.

The range slider further includes a minimum value slider thumb (e.g. 104) placeable by user interaction with the graphical user interface at the minimum endpoint of the selected range (e.g. 110). The minimum value slider has an inside edge (e.g. 114) and an outside edge 126. The inside edge 114 of the minimum value slider is more proximate the maximum track (e.g. 122) value than the outside edge 126 of the minimum value slider thumb. The minimum value slider thumb is placeable at the minimum endpoint by placing the inside edge 114 of the minimum value slider thumb at the minimum endpoint.

The range slider further includes a maximum value slider thumb (e.g. 106) placeable by user interaction with the graphical user interface at the maximum endpoint of the selected range. The maximum value slider has an inside edge (e.g. 116) and an outside edge 128. The inside edge 116 of the maximum value slider is more proximate the minimum track value (e.g. 120) than the outside edge 128 of the minimum value slider thumb. The maximum value slider thumb is placeable at the maximum endpoint by placing the inside edge 116 of the maximum value slider thumb at the maximum endpoint, such that the minimum value slider thumb and the maximum value slider thumb do not overlap for any selected range.

The method 500 further includes detecting a minimum selecting user interaction on a graphical user interface (act 504). For example a user could use a mouse or touch action to place the minimum value slider thumb 104.

As a result of detecting a minimum selecting user interaction on the graphical user interface, the method 500 further includes placing the minimum slider thumb at value on the slider track by placing the inside edge of the minimum slider thumb on the value to select the minimum endpoint of the selected range at the inside edge of the minimum slider thumb (act 506).

The method 500 further includes detecting a maximum selecting user interaction on the graphical user interface (act 508).

As a result of detecting a maximum selecting user interaction on a graphical user interface, the method 500 further includes placing the maximum slider thumb at a value on the slider track by placing the inside edge of the maximum slider thumb on the value to select the maximum endpoint of the selected range at the inside edge of the maximum slider thumb (act 510). Embodiments do not need to include all elements of method 500. For example, the subsequence 502, 504, 506 is valid, as well as the subsequence 502, 508, 510.

The method 500 may be practiced where wherein detecting a minimum selecting user interaction on a graphical user interface comprises detecting a user interaction that is proximate the range slider within a larger logical region that encompasses the range slider itself and other UI elements associated with the range slider, but not on the range slider, and is more proximate a current position of the minimum slider thumb than the maximum slider thumb. Similarly, the method 500 may be practiced where detecting a maximum selecting user interaction on a graphical user interface comprises detecting a user interaction that is proximate the range slider within a larger logical region that encompasses the range slider itself and other UI elements associated with the range slider but not on the range slider, and is more proximate a current position of the maximum slider thumb than the minimum slider thumb.

The method 500 may be practiced where detecting a minimum selecting user interaction on a graphical user interface and a maximum selecting user interaction on a graphical user interface comprises detecting mouse clicks. Alternatively or additionally, the method 500 may be practiced where detecting a minimum selecting user interaction on a graphical user interface and a maximum selecting user interaction on a graphical user interface comprises detecting user touch.

The method 500 may be practiced where detecting a minimum selecting user interaction on a graphical user interface includes detecting an interaction location. The method 500 further includes moving the center of the minimum value slider thumb to the interaction location, such that the interaction location and the minim endpoint of the selected range are at different points.

The method 500 may further include representing the maximum endpoint of the selected range as an open ended point as a result of the maximum value slider thumb being manually placed at the maximum track value. Similarly, the method 500 may further include representing the minimum endpoint of the selected range as an open ended point as a result of the minimum value slider thumb being manually placed at the minimum track value.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of operating a range slider, the method comprising:
    displaying a range slider in a graphical user interface, wherein the range slider comprises:
        a slider track representing a track range of values, including a minimum track value and a maximum track value, from which a selected range of values can be selected, the selected range of values including a minimum endpoint corresponding to a minimum value slider thumb, and a maximum endpoint corresponding to a maximum slider thumb;
        the minimum value slider thumb being placeable by user interaction with the graphical user interface at the minimum endpoint of the selected range so as to define the minimum endpoint of the selected range, the minimum value slider thumb having a perimeter defining the shape of the minimum value slider, the perimeter having an inside edge defining a portion of the perimeter of the minimum value slider thumb that is most proximate the maximum value slider thumb, and wherein the minimum value slider thumb is placeable at the minimum endpoint so as to define the minimum endpoint by placing the inside edge of the minimum value slider thumb at the minimum endpoint; and
        the maximum value slider thumb being placeable by user interaction with the graphical user interface at the maximum endpoint of the selected range so as to define the maximum endpoint of the selected range, the maximum value slider thumb having a perimeter defining the shape of the maximum value slider thumb, the perimeter having an inside edge and an outside edge, wherein the inside edge of the maximum value slider thumb is a portion of the perimeter of the maximum value slider thumb that is most proximate the minimum value slider thumb, and wherein the maximum value slider thumb is placeable at the maximum endpoint so as to define the maximum endpoint by placing the inside edge of the maximum value slider thumb at the maximum endpoint, such that the minimum value slider thumb and the maximum value slider thumb do not overlap for any selected range;
    detecting a minimum selecting user interaction on a graphical user interface;
    as a result of detecting a minimum selecting user interaction on the graphical user interface, placing the minimum slider thumb at the minimum endpoint value on the slider track by aligning the inside edge of the minimum slider thumb with the minimum endpoint value to select and define the minimum endpoint of the selected range according to the position of the inside edge of the minimum slider thumb;
    detecting a maximum selecting user interaction on the graphical user interface; and
    as a result of detecting a maximum selecting user interaction on a graphical user interface, placing the maximum slider thumb at the maximum endpoint value on the slider track by aligning the inside edge of the maximum slider thumb with the maximum endpoint value to select and define the maximum endpoint of the selected range according to the position of the inside edge of the maximum slider thumb.

2. The method of claim 1, wherein detecting the minimum selecting user interaction on the graphical user interface comprises detecting a user interaction that is proximate the range slider within a larger logical region that encompasses the range slider itself and other UI elements associated with the range slider, but not on the range slider or the minimum slider thumb, and is more proximate a current position of the minimum slider thumb than the maximum slider thumb.

3. The method of claim 1, wherein detecting the maximum selecting user interaction on the graphical user interface comprises detecting a user interaction that is proximate the range slider within a larger logical region that encompasses the range slider itself and other UI elements associated with the range slider but not on the range slider or the maximum slider thumb, and is more proximate a current position of the maximum slider thumb than the minimum slider thumb.

4. The method of claim 1, wherein detecting the minimum selecting user interaction on the graphical user interface and the maximum selecting user interaction on the graphical user interface comprises detecting mouse clicks.

5. The method of claim 1, wherein detecting the minimum selecting user interaction on the graphical user interface and the maximum selecting user interaction on the graphical user interface comprises detecting user touch.

6. The method of claim 1, wherein detecting the minimum selecting user interaction on the graphical user interface comprises detecting an interaction location, the method further comprising moving a center of the minimum value slider thumb to alignment with the interaction location, such that the interaction location and the minimum endpoint of the selected range are at different points.

7. The method of claim 1 further comprising representing the maximum endpoint of the selected range as an open ended point as a result of the maximum value slider thumb being manually placed at the maximum track value.

8. The method of claim 1 further comprising representing the minimum endpoint of the selected range as an open ended point as a result of the minimum value slider thumb being manually placed at the minimum track value.

9. A hardware storage device comprising computer executable instructions that are executable by one or more processors of a computing system to cause the following to be performed by the computing system:

displaying a range slider in a graphical user interface, wherein the range slider comprises
- a slider track representing a track range of values, including a minimum track value and a maximum track value, from which a selected range of values can be selected, the selected range of values including a minimum endpoint corresponding to a minimum value slider thumb, and a maximum endpoint corresponding to a maximum value slider thumb;
- the minimum value slider thumb being placeable by user interaction with the graphical user interface at the minimum endpoint of the selected range so as to define the minimum endpoint of the selected range, the minimum value slider thumb having a perimeter defining the shape of the minimum value slider, the perimeter having an inside edge and an outside edge, wherein the inside edge of the minimum value slider thumb is a portion of the perimeter of the minimum value slider thumb that is most proximate the maximum value slider thumb, and wherein the minimum value slider thumb is placeable at the minimum endpoint so as to define the minimum endpoint by placing the inside edge of the minimum value slider thumb at the minimum endpoint; and
- the maximum value slider thumb being placeable by user interaction with the graphical user interface at the maximum endpoint of the selected range so as to define the maximum endpoint of the selected range, the maximum value slider thumb having a perimeter defining the shape of the maximum value slider thumb, the perimeter having an inside edge and an outside edge, wherein the inside edge of the maximum value slider thumb is a portion of the perimeter of the maximum value slider thumb that is most proximate the minimum value slider thumb, and wherein the maximum value slider thumb is placeable at the maximum endpoint so as to define the maximum endpoint by placing the inside edge of the maximum value slider thumb at the maximum endpoint, such that the minimum value slider thumb and the maximum value slider thumb do not overlap for any selected range;

detecting a minimum selecting user interaction on a graphical user interface;

as a result of detecting a minimum selecting user interaction on the graphical user interface, placing the minimum slider thumb at a minimum endpoint value on the slider track by aligning the inside edge of the minimum slider thumb with the minimum endpoint value to select and define the minimum endpoint of the selected range according to the position of the inside edge of the minimum slider thumb;

detecting a maximum selecting user interaction on the graphical user interface; and as a result of detecting a maximum selecting user interaction on a graphical user interface, placing the maximum slider thumb at a maximum endpoint value on the slider track by aligning the inside edge of the maximum slider thumb with the maximum endpoint value to select and define the maximum endpoint of the selected range according to the position of the inside edge of the maximum slider thumb.

10. The computer readable medium of claim 9, wherein detecting the minimum selecting user interaction on the graphical user interface comprises detecting a user interaction that is proximate the range slider within a larger logical region that encompasses the range slider itself and other UI elements associated with the range slider, but not on the range slider or the minimum slider thumb, and is more proximate a current position of the minimum slider thumb than the maximum slider thumb.

11. The computer readable medium of claim 9, wherein detecting maximum selecting user interaction on graphical user interface comprises detecting a user interaction that is proximate the range slider within a larger logical region that encompasses the range slider itself and other UI elements associated with the range slider but not on the range slider or the maximum slider thumb, and is more proximate a current position of the maximum slider thumb than the minimum slider thumb.

12. The computer readable medium of claim 9, wherein detecting the minimum selecting user interaction on graphical user interface and the maximum selecting user interaction on the graphical user interface comprises detecting mouse clicks.

13. The computer readable medium of claim 9, wherein detecting the minimum selecting user interaction on the graphical user interface and the maximum selecting user interaction on the graphical user interface comprises detecting user touch.

14. The computer readable medium of claim 9, wherein detecting the minimum selecting user interaction on the graphical user interface comprises detecting an interaction location, the method further comprising moving a center of the minimum value slider thumb to alignment with the interaction location, such that the interaction location and the minimum endpoint of the selected range are at different points.

15. The computer readable medium of claim 9 further comprising representing the maximum endpoint of the selected range as an open ended point as a result of the maximum value slider thumb being manually placed at the maximum track value.

16. The computer readable medium of claim 9 further comprising representing the minimum endpoint of the selected range as an open ended point as a result of the minimum value slider thumb being manually placed at the minimum track value.

17. A computing system, the computing system comprising:
- one or more processors; and
- one or more computer readable hardware storage devices, wherein the one or more computer readable hardware storage devices comprise computer executable instructions that executable by at least one of the one or more processors cause the system to perform the following:
  - displaying a range slider in a graphical user interface, wherein the range slider comprises:
    - a slider track representing a track range of values, including a minimum track value and a maximum track value from which a range of values can be selected, the selected range of values including a minimum endpoint corresponding to a minimum value slider thumb and a maximum endpoint corresponding to a maximum slider thumb;
    - the minimum value slider thumb being placeable by user interaction with the graphical user interface at the minimum endpoint of the selected range so as to define the minimum endpoint of the selected range, the minimum value slider thumb having a perimeter defining the shape of the minimum value slider, the perimeter having an inside edge defining a portion of the perimeter of the minimum value slider thumb that is most proximate the maximum value slider thumb, and wherein the minimum value slider thumb is placeable at the minimum endpoint so as to define the minimum endpoint by placing the inside edge of the minimum value slider thumb at the minimum endpoint; and the maximum value slider thumb being placeable by user interaction with the graphical user interface at the maximum endpoint of the selected range so as to define the maximum endpoint of the selected range, the maximum value slider thumb having a perimeter defining the shape of the maximum value slider thumb, the perimeter having an inside edge and an outside edge, wherein the inside edge of the maximum value slider thumb is a portion of the perimeter of the maximum value slider thumb that is most proximate the minimum value slider thumb, and wherein the maximum value slider thumb is placeable at the maximum endpoint so as to define the maximum endpoint by placing the inside edge of the maximum value slider thumb at the maximum endpoint, such that the minimum value slider thumb and the maximum value slider thumb do not overlap for any selected range;

detecting a minimum selecting user interaction on a graphical user interface;

as a result of detecting a minimum selecting user interaction on the graphical user interface, placing a minimum slider thumb at a minimum endpoint value on the slider track by aligning an inside edge of the minimum slider thumb with the minimum value to select and define the minimum endpoint of the selected range at the inside edge of the minimum slider thumb, the inside edge of the minimum slider thumb comprising a portion of a perimeter of the minimum slider thumb that is more proximate the maximum value slider thumb;

detecting a maximum selecting user interaction on the graphical user interface; and as a result of detecting a maximum selecting user interaction on a graphical user interface, placing a maximum slider thumb at a maximum endpoint value on the slider track by aligning an inside edge of the maximum slider thumb with the maximum value to select and define the maximum endpoint of the selected range at the inside edge of the maximum slider thumb, the inside edge of the maximum slider thumb comprising a portion of a perimeter of the maximum slider thumb that is more proximate the minimum value slider thumb.

18. The computing system of claim 17, wherein detecting the minimum selecting user interaction on the graphical user interface comprises detecting a user interaction that is proximate the range slider within a larger logical region that encompasses the range slider itself and other UI elements associated with the range slider, but not on the range slider or the minimum slider thumb, and is more proximate a current position of the minimum slider thumb than the maximum slider thumb.

19. The computing system of claim 17, wherein detecting the minimum selecting user interaction on the graphical user interface and the maximum selecting user interaction on the graphical user interface comprises detecting user touch.

20. The computing system of claim 17, wherein detecting the minimum selecting user interaction on the graphical user interface comprises detecting an interaction location, the method further comprising moving a center of the minimum value slider thumb to alignment with the interaction location, such that the interaction location and the minimum endpoint of the selected range are at different points.

* * * * *